United States Patent [19]

Dien et al.

[11] Patent Number: 4,628,765
[45] Date of Patent: Dec. 16, 1986

[54] SPHERICAL ROBOTIC WRIST JOINT

[75] Inventors: Robert Y. Dien, Northboro, Mass.; Ethan C. Luce, Scotia, N.Y.

[73] Assignee: Rensselaer Polytechnic Institute, Troy, N.Y.

[21] Appl. No.: 706,026

[22] Filed: Feb. 27, 1985

[51] Int. Cl.$^4$ .................. G05G 11/00; F16H 37/06
[52] U.S. Cl. .................. 74/665 A; 901/18; 901/25; 901/29; 74/479
[58] Field of Search .............. 901/18, 25, 29; 74/479, 74/665 A, 665 C, 665 D

[56] References Cited

U.S. PATENT DOCUMENTS

| | | | |
|---|---|---|---|
| 2,681,783 | 6/1954 | Smith | 248/182 |
| 3,212,651 | 10/1965 | Specht et al. | 901/25 X |
| 3,973,469 | 8/1976 | Humen | 91/51 |
| 4,045,958 | 9/1977 | Wells | 60/325 |
| 4,068,536 | 1/1978 | Stackhouse | 74/417 |
| 4,068,763 | 1/1978 | Fletcher et al. | 901/29 X |
| 4,073,201 | 2/1978 | Taylor et al. | 74/665 L |
| 4,194,437 | 3/1980 | Rosheim | 92/120 |
| 4,296,681 | 10/1981 | Rosheim | 92/122 |

FOREIGN PATENT DOCUMENTS

| | | | |
|---|---|---|---|
| 0106561 | 4/1984 | European Pat. Off. | 901/29 |
| 270110 | 7/1970 | U.S.S.R. | 901/18 |

*Primary Examiner*—Kenneth J. Dorner
*Assistant Examiner*—Dirk Wright
*Attorney, Agent, or Firm*—McGlew and Tuttle

[57] ABSTRACT

A robotic wrist joint comprises a spherical member which is mounted within a ring shaped housing for rotational movement in any direction. A control pin extends from an outer surface of the spherical member. A first semi-circular yoke is pivotally mounted to the ring shaped housing and carries a first track. A second yoke is provided in a position radially inwardly of the first yoke. The second yoke is also semi-circular and is mounted for rotation on the housing about an axis perpendicular to the rotational axis of the first yoke. The second yoke carries a second track. The control pin extends into both the first and the second track so that the spherical member can be brought into any desired location by selectively pivoting the yokes.

7 Claims, 3 Drawing Figures

SPHERICAL ROBOTIC WRIST JOINT

FIELD AND BACKGROUND OF THE INVENTION

The present invention relates in general to the field of robotics, and in particular to a new and useful robotic wrist joint which has a spherical member which can be positioned at any orientation within its work space without encountering a singularity point.

Known mechanical robot wrist joints can be classified into three types. These are the pitch-yaw-roll type the roll-bend-roll type and the three roll type. "Three Roll" is a trademark of the Cincinnati Milacrom Company.

All three types either get "twisted" or have other singularity problems associated with them. Singularities are points where a high acceleration or velocity is needed to maintain motion constraints.

See U.S. Pat. Nos. 4,296,681; 4,068,536; and 4,045,958.

Also see U.S. Pat. No. 4,194,437 to Rosheim which shows a hydraulic servo mechanism having at least two degrees of freedom and utilizing a spherical member which is driven by hydraulics.

U.S. Pat. No. 4,073,201 to Taylor et al is relevant for its showing of a powered wrist joint which can be used on a robot arm and which uses a C-shaped configuration.

U.S. Pat. No. 3,973,469 to Humen is relevant for its showing of a power transmission mechanism which utilizes a spherical member and provides several degrees of freedom. Also see U.S. Pat. No. 2,681,783 to Smith which shows a selflevelling device utilizing a sphere and socket arrangement for providing several degrees of freedom.

In developing the present invention, a study was made of the various wrist joint designs.

The pitch-yaw-roll configuration was noted to have a singularity point located at a position where the revolute joints were near their limits. The singularity itself came about as the wrist attempted to "untwist itself" in order to achieve desired trajectory and velocity constraints. The resulting motion involved extremely high velocities and acceleration sometimes resulting in shutdown of the system as the inertial forces deflected the joints past their limit stops. Tests were conducted using the Cincinnati Milacrom T3 robot. It was determined that a problem in the pitch-yaw-roll design was the distance between the axes of rotation. It was noted that as the wrist became larger, higher velocities and accelerations would have to be achieved in order to maintain motion within the given constraints.

The roll-bend-roll wrist configuration was then studied and it was observed that a singularity point occurred as one attempted to bend the wrist around an axis perpendicular to a second joint of the wrist. An attempt to accomplish this motion resulted in high velocity roll of the first wrist joint. A singularity problem was also encountered when the robot was moved in a "world coordinate mode". A PUMA 600 was used for these tests. It was found that as the wrist was rotated past its singularity point, the first roll joint in the wrist would rotate at a high velocity and acceleration. Many times the joint would reach its limit stops before completing the required motion. The singularity problem was found to be extremely prevalent in this robot design.

It was determined that in order to avoid some of the singularity problems, the distance between axes of rotation should be reduced and also physical limitations should be avoided which caused the singularity problems. As will be described more fully later, the desire to minimize the distance between the axes of rotation led to the use of a spherical joint. A spherical joint with all axes of rotation intersecting at a single point was found most desirable.

SUMMARY OF THE INVENTION

The present invention is drawn to a mechanical wrist joint which is primarily suited to the field of robots but which can also be used in devices needing two or more degrees of freedom. The invention can find use for example in solar collectors, scanning antennas and search lights.

According to the inventive mechanism, a substantially spherical member is used as a central element in the joint. The spherical member can be driven to any orientation without interruption. The entire wrist joint including spherical member and drive mechanism, is free of singularities and extremely compact in size. The use of a spherical joint places all axes of rotation at one point thereby eliminating the problem of having the joint become "twisted-up" which occurred in prior art wrist designs.

The novel drive system comprises two perpendicular semi-circular yokes mounted so as to surround the spherical member. Slots or guide tracks are cut into the yokes and accept a control pin which is mounted so as to protrude from the spherical member. By rotating the yokes in a controlled fashion, the control pin can be moved to position the spherical member at any orientation within its work space.

Accordingly an object of the present invention is to provide a mechanical wrist joint which comprises a substantially spherical member having an outer motion surface, a control pin extends outwardly from the surface. A housing engages the motion surface and supports the sphere for movement in a plurality of directions. An outer control yoke is rotatably mounted to the housing about a first axis of rotation and extends at least partly around the spherical member. A first track or slot is defined in the outer control yoke in which the pin moves for rotating the spherical member in a direction perpendicular to the first axis. An inner control yoke is also rotatably mounted to the housing but about a second axis which is perpendicular to the first axis. It carries a second track or slot which guides the control pin. The inner control yoke also extends at least partly around the spherical member and provides for rotation of that member, through movement of the control pin, in a direction perpendicular to the second axis.

The spherical member can also rotate about an axis extending through the control pin for providing a third degree of freedom.

A further object of the present invention is to provide a mechanical wrist joint which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
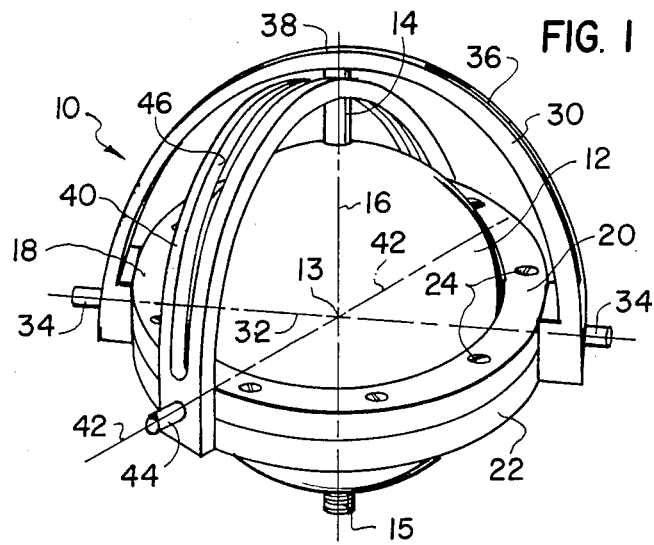
FIG. 1 is a perspective view of the inventive mechanical wrist joint.

Referring to the drawings in particular, the invention embodied in FIG. 1 comprises a mechanical wrist joint generally designated 10 which is particularly useful as a robotic wrist joint.

The joint includes a substantially spherical member 12 having a geometric center 13 through which a control pin 14 extends. Control pin 14 lies on an axis 16. The spherical member 12 can rotate about axis 16 which represents a first degree of freedom. A lower end 15 of control pin 14 can be attached to a claw or other mechanism. Any other means of connecting an element to spherical member 12 can also be exploited.

Spherical member 12, in a working model of the invention, has a diameter of 4.47 inches and is made of hard plastic covering a rubber core. The control pin 14 is mounted through a half inch hole drilled centrally through the spherical member. While not shown in the drawings, it is noted that the spherical member can also have an actuator mounted beneath its surface for use in controlling a roll orientation about axis 16. Mounting this actuator within the sphere would maintain the wrist's compact size without altering the dynamics of the wrist significantly.

Figure 2:
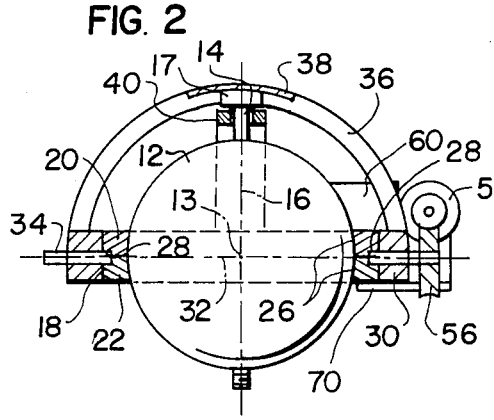
FIG. 2 is a side-sectional view of the wrist joint shown in FIG. 1, showing also elements which can be used to drive the wrist.

Spherical member 12 is mounted for movement in a housing 18. Housing 18 is formed of an upper ring 20 and a lower ring 22 which are engaged onto upper and lower ends of the spherical member 12 and bolted to each other by screws or bolts 24. As shown in FIG. 2, the upper and lower rings each have an inner annular surface 26 which acts as a sliding journal surface for movement and rotation of spherical member 12. These surfaces are beveled so that member 12 cannot disengage from its housing 18.

Housing 18 is preferably made of steel.

At four spaced apart locations, housing 18 includes bores 28 which respectively receive pivot pins of an inner and an outer yoke to be described hereinunder.

Outer yoke 30 is pivotally mounted to housing 18 about an axis of rotation 32. Yoke 30 includes a pair of pivot pins 34 which are fixed to ends of the yoke and extend into two of the bores 28 of housing 18. Pivot axis 32 for yoke 30 intersects the geometric center 13 of spherical member 12.

Yoke 30 is semi-circular and thus extends at least partly around the spherical member 12 in an arc. A first track or slot 36 is defined in yoke 30. The central portion of the slot is covered by a ridge area 38 for strength to prevent widening of the slot when forces are applied to it. An inner yoke 40 is also rotatably mounted to housing 18. This rotation is about an axis 42 which intersects the center 13 of the spherical member 12. Inner yoke 40 includes pins 44 which are fixed thereto and extend into two additional holes in the housing 18.

Inner yoke 40 includes a second track or slot 46. Control pin 14 extends through slot 46 of inner yoke 40 and into slot 36 of outer yoke 30. In this way spherical member 12 can be brought into any position within its working range by rotating yoke 30 about its axis 32 and/or rotating yoke 40 about its axis 42.

To establish a more positive sliding contact between control pin 14 and slot 36, the end of control pin 14 is provided with a low friction cap 17. This cap has flat side surfaces for sliding against the sides of slot 36.

Cap 17 may be made for example of Delrin (a tradename).

The use of this low friction cap produces friction and avoids binding problems.

Figure 3:
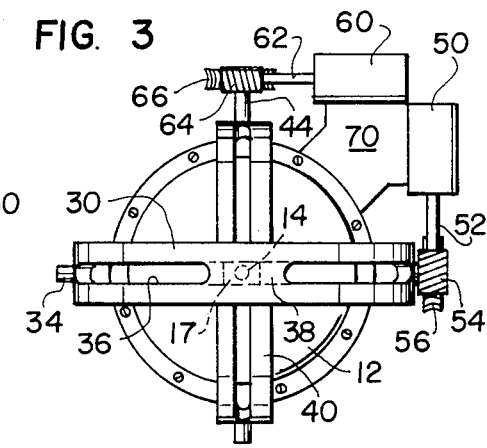
FIG. 3 is a top plan view of the structure shown in FIG. 2.

As shown in FIGS. 2 and 3, yokes 30 and 40 may be respectively rotated by motors 50 and 60. The motors include shafts 52 and 62 connected to worms 54 and 64 respectively. The worms mesh with worm gears 56 and 66 respectively. Worm gear 56 is connected to one of the pins 34 which is fixed to outer yoke 30 and gear 66 is connected to one of the pins 44 connected to inner yoke 40. Motors 50,60 can be attached by a mounting plate 70 to a lower surface of housing 18. Care must be taken in selecting the size and position of the mounting plate 70 and its motors to permit maximum pivotal movement of the yokes.

While a specific embodiment of the invention has been shown and described in detail to illustrate the application of the principles of the invention, it will be understood that the invention may be embodied otherwise without departing from such principles.

What is claimed is:

1. A mechanical wrist joint comprising:
   a substantially spherical, groove-free member having an outer surface which is spherical and continuous, said outer surface having a geometric center;
   a control pin extending radially from said outer surface;
   a ring-shaped housing engaging said outer surface and permitting relative movement between said spherical member and said housing in any direction around said center, said housing lying in a plane containing said center, said housing having an inner annular spherical surface in sliding contact with said outer surface and having a center of curvature at said outer surface center;
   an outer control yoke rotatably mounted to said housing at about a first axis and extending at least partly around said spherical member, said outer yoke having a first track defined therein, said pin movable in said track for rotation of said spherical member with motion of said pin in said first track; and
   an inner control yoke rotatably mounted to said housing about a second axis which is perpendicular to said first axis, said inner yoke extending at least partly around said spherical member and including a second track defined therein, said pin movably engaged in said second track for rotation of said spherical member with motion of said pin in said second track, said second track extending through said inner control yoke and forming a slot therein; said inner and outer yokes each being substantially semi-circular and being pivotally mounted to said ring-shaped housing about said first and second perpendicular axes.

2. A mechanical wrist joint according to claim 1, wherein said first track comprises a slot in said outer control yoke, said outer control yoke having a central closing bridge covering a central portion of said slot in said outer yoke.

3. A robotic wrist joint comprising:
a sphere having an outer continuous groove-free spherical surface;
a control pin connected to said sphere and extending radially outwardly of said surface;
a ring-shaped housing having an inner journal surface engaged with said outer surface of said sphere for rotation and displacement of said sphere with respect to said housing, said inner surface shaped to confine said sphere in said housing;
an outer semi-circular control yoke rotatably mounted about a first axis to said housing and over said sphere, said yoke having a first slot therein, said control pin extending into said slot and movable along said slot for rotating said sphere about an axis of rotation perpendicular to said first axis; and
a semi-circular inner control yoke rotatably mounted to said housing about a second axis which is perpendicular to said first axis, said inner yoke having a second slot therein, said control pin extending into said second slot and movable along said second slot for rotating said sphere about an axis perpendicular to said second axis;
said pin being movable in said first slot of said outer yoke by rotation of said inner yoke about its second axis and said pin being movable in said second slot of said inner yoke by rotation of said outer yoke about its first axis;
a slide cap connected to an end of said pin and engaged in said first slot of said outer control yoke; and
said outer control yoke including a central bridge overlying a central portion of said first slot.

4. A mechanical wrist joint according to claim 2, wherein said inner and outer control yokes are each substantially semi-circular, said housing being ring shaped and engaged around said spherical member.

5. A mechanical wrist joint according to claim 2, including a slide cap connected to said control pin, said slot forming said first track having parallel side walls, said cap having parallel side walls engaged with said parallel side walls of said slot.

6. A mechanical wrist joint according to claim 5, wherein said ring shaped housing includes four holes therein evenly spaced therearound, each of said control yokes having a pivot pin at each end thereof enageged into one of said holes.

7. A mechanical wrist joint according to claim 6, wherein said housing comprises an upper ring segment and a lower ring segment connected to said upper ring segment, said ring segments defining an inner beveled surface engaged with said outer surface of said spherical member.

* * * * *